United States Patent [19]

Riedel

[11] 3,717,405
[45] Feb. 20, 1973

[54] CINEMATOGRAPHIC APPARATUS WITH COUPLING MEANS FOR DETACHABLE FILM-CONTAINING CASSETTES

[75] Inventor: Wolfgang Riedel, Winnenden, Germany

[73] Assignee: Robert Bosch Photokine GmbH, Stuttgart-Unterturkheim, Germany

[22] Filed: Feb. 24, 1971

[21] Appl. No.: 118,302

[30] Foreign Application Priority Data

Feb. 26, 1970 Germany.....................P 20 08 974.1

[52] U.S. Cl................................352/72, 352/242
[51] Int. Cl.............................................G03b 23/02
[58] Field of Search..........................352/72, 74, 242

[56] References Cited

UNITED STATES PATENTS 3,583,655  6/1971  Roman..............................352/72 X
3,551,038  12/1970  Bundschuh et al......................352/72

FOREIGN PATENTS OR APPLICATIONS 361,714  6/1962  Switzerland............................352/72

Primary Examiner—Samuel S. Matthews
Assistant Examiner—Fred L. Braun
Attorney—Michael S. Striker

[57] ABSTRACT

The housing of a motion picture projector for use with film-containing cassettes has a top wall which supports an upwardly extending inverted U-shaped handle. The handgrip portion of the handle is connected with a plate which is provided with elastic tongues receivable in openings provided in the rear panel of the casing of a cassette when the casing rests on the top wall of the housing adjacent to the handle. The tongues then engage suitably inclined surfaces in the openings of the rear panel to separably hold the cassette in a desired position. The top wall of the housing has upwardly extending projections which extend into sockets provided therefor in the bottom panel of the casing and the plate has platforms which abut against the exposed surface of the rear panel when the tongues are received in the respective openings and the projections of the top wall extend into the adjacent sockets.

10 Claims, 3 Drawing Figures

PATENTED FEB 20 1973  3,717,405

INVENTOR
Wolfgang RIEDEL
BY
Adam S. Steiber
his ATTORNEY 3,717,405

CINEMATOGRAPHIC APPARATUS WITH COUPLING MEANS FOR DETACHABLE FILM-CONTAINING CASSETTES

BACKGROUND OF THE INVENTION

The present invention relates to cinematographic apparatus in general, and more particularly to improvements in cinematographic apparatus (especially motion picture projectors) which employ cassettes or analogous containers for convoluted motion picture film. Still more particularly, the invention relates to improvements in means for detachably securing the casings of film-containing cassettes to a motion picture projector.

In motion picture projectors which utilize cassettes, the means for supporting a cassette in operative position is normally located at a level above the projection gate. This is considered desirable in order to facilitate the threading of motion picture film along a predetermined path extending from the cassette, past one or more loop formers and projection gate, and on to the takeup reel. The properly mounted cassette comes to rest on a supporting surface which is located below and at a predetermined distance from coupling elements (such as elastic fingers or the like) cooperating with complementary coupling elements of the cassette to hold the latter in a requisite position with reference to the housing of the projector. As a rule, the complementary coupling elements are provided on the rear panel of the casing of the cassette and include projections and/or recesses cooperating with suitable recesses and/or projections on the housing of the projector. In many presently known projectors, the stationary coupling elements are provided on a vertical plate which is recessed into the housing and against which the rear panel of the casing of a properly inserted cassette abuts. Reference may be had, for example, to German printed publication No. 1,926,195.

A drawback of stationary coupling means which are mounted in the interior of the housing of a motion picture projector is that the dimensions of the housing necessarily exceed the minimum dimensions which are required to properly accommodate all essential components and units of the projector. The housing of the projector is normally higher than necessary because its interior must accommodate the essential components as well as at least a portion of a properly mounted cassette. This contributes to higher cost of the projector and detracts from the eye-pleasing appearance of the housing.

SUMMARY OF THE INVENTION

An object of the invention is to provide a cinematographic apparatus, particularly a motion picture projector, with novel and improved means for separably connecting the casing of a film-containing cassette or an analogous film container to the projector housing in such a way that the cassette need not extend into the interior of the housing and that the configuration and dimensions of the housing need not be affected by the fact that the projector serves to project images of film frames which are stored in a cassette.

Another object of the invention is to provide a motion picture projector wherein certain parts which perform their normal or main function can also serve to insure proper positioning of a separable cassette on the housing of the projector.

A further object of the invention is to provide a novel handle for the housing of a cinematographic apparatus.

An additional object of the invention is to provide the housing of a motion picture projector with a novel top wall.

Still another object of the invention is to provide a motion picture projector which utilizes film-containing cassettes with a housing which need not be bigger or bulkier than the housing of a conventional projector which utilizes exposed supply reels for motion picture film.

The invention is embodied in a cinematographic apparatus, particularly in a motion picture projector, which comprises a housing, a handle provided on and preferably extending upwardly beyond the top wall of the housing, a film-containing cassette adjacent to the handle and preferably resting on the exposed surface of the top wall, and coupling means for separably locating the cassette in a predetermined position with reference to the housing. In accordance with a feature of the invention, the coupling means comprises at least one first coupling portion which is provided in and/or on the casing of the cassette and at least one complementary second coupling portion which is supported by the handle and separably engages the first coupling portion to thereby hold the casing of the cassette in the predetermined position.

The second coupling portion may form an integral part of the handle or it may be provided on a carrier which is preferably separably secured to the handle, for example, to the handgrip portion of the handle.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
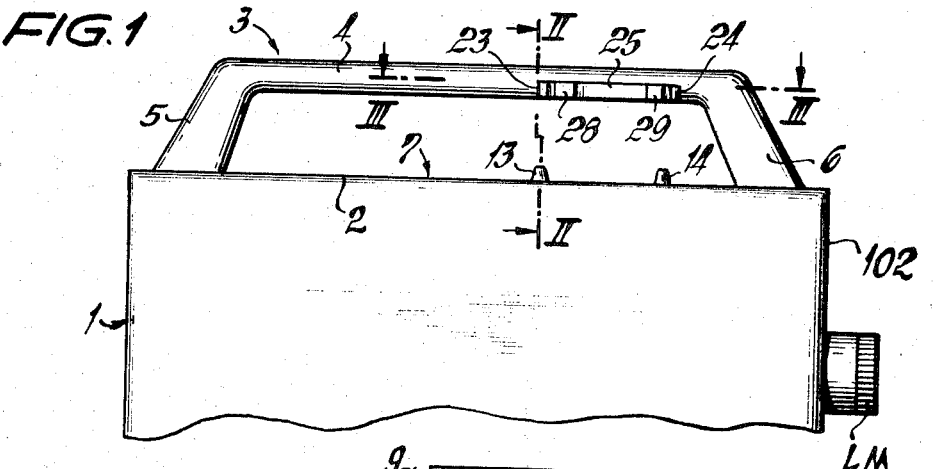
FIG. 1 is a fragmentary schematic side elevational view of a motion picture projector which embodies one form of the invention.
Figure 2:
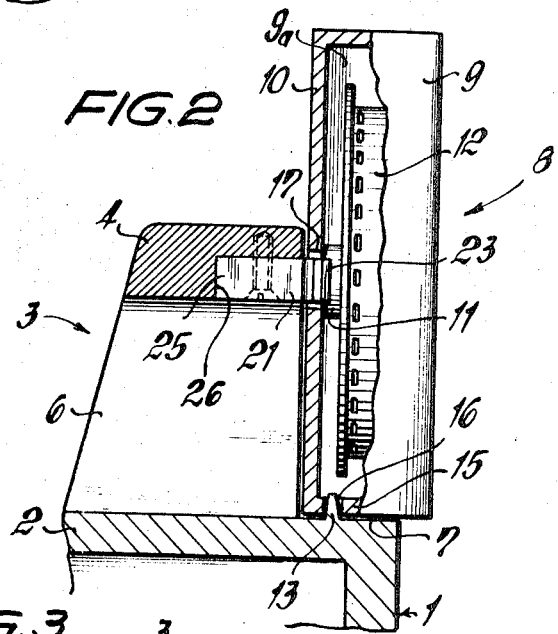
FIG. 2 is an enlarged transverse vertical sectional view as seen in the direction of arrows from the line II—II of FIG. 1, further showing a cassette in operative position with the casing of the cassette partly broken away.
Figure 3:
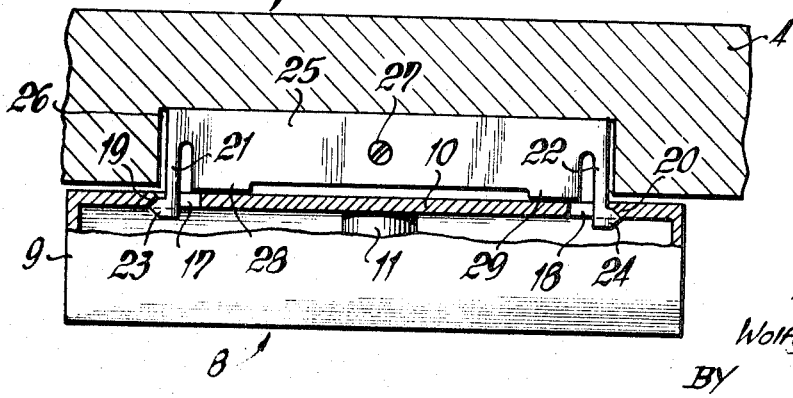
FIG. 3 is an enlarged horizontal sectional view as seen in the direction of arrows from the line III—III of FIG. 1, the casing of the cassette being shown partly in a plan view and partly in horizontal section.

Referring first to FIG. 1, there is shown a portion of a motion picture projector which includes a housing 1 having a horizontal top wall 2 and a front wall 102 which carries a lens mount LM. The top wall 2 supports an inverted U-shaped handle 3 which includes a substantially horizontal elongated handgrip portion or web 4 and two connecting portions 5, 6 which connect the ends of the handgrip portion 4 with the housing 1. The entire handle 3 can be made integral with the top wall 2. The exposed upper surface 7 of the top wall 2 is horizontal and serves as a support for the casing 9 of a detachable film-containing cassette 8. When the cassette 8 is mounted on the housing 1 in a predetermined position which is shown in FIGS. 2 and 3, the bottom panel 15 of the casing 9 abuts against and rests on the exposed surface 7 of the top wall 2. The handgrip portion 4 of the handle 3 is parallel to the top wall 2 and extends in the longitudinal direction of the housing 1. In the illustrated embodiment, the connecting portions 5, 6 are integral with the ends of the handgrip portion 4.

The casing 9 is rectangular and further includes a vertical rear panel 10 and defines a chamber 9a for a supply reel 12 having a core which is surrounded by a supply of convoluted motion picture film. The rear panel 10 carries a shaft 11 which rotatably supports the core of the supply reel 12. The bottom panel 15 of the casing 9 is formed with two cutouts or sockets 16 (only one shown in FIG. 2) which serve to receive projections 13, 14 provided on the top wall 2 and extending upwardly beyond the exposed surface 7. The projections 13, 14 taper upwardly and serve to hold the casing 9 of the properly mounted cassette 8 against lengthwise as well as against sidewise movement with reference to the housing 1.

In accordance with a feature of the present invention, the coupling means which detachably or separably secures the cassette 8 to the housing 1 in the illustrated predetermined or operative position comprises stationary coupling portions which are supported by the handle 3 and complementary coupling portions which are provided on the rear panel 10 of the casing 9. The cooperating stationary and complementary coupling portions insure that the casing 9 cannot accidentally leave the position which is determined by the projections 13, 14 when such projections extend into the sockets 16 of the bottom panel 15. The cooperating coupling portions are located at a predetermined level above the surface 7 of the top wall 2 and are strong enough to insure proper retention of the casing 9 while still permitting rapid separation of the cassette 8 from the housing 1 when the operator so desires.

The coupling portions on the rear panel 10 of the casing 9 include two openings 17, 18 which are preferably located in a common horizontal plane and are bounded in part by inclined retaining surfaces 19, 20. In the illustrated embodiment, the openings 17, 18 are located at the level of the shaft 11. The stationary portions of the coupling means comprise two elastic tongues 21, 22 which are supported by the handgrip portion 4 and have wedge-like heads 23, 24 which can be caused to enter the openings 17, 18 with simultaneous deformation of the tongues 21, 22. The tongues are thereupon permitted to reassume their unstressed or undeformed positions whereby the heads 23, 24 respectively engage the inclined retaining surfaces 19, 20 and hold the casing 9 against movement away from the handle 3. It can be said that the surfaces 19, 20 of the rear panel 10 and the wedge-like heads 23, 24 of the elastic tongues 21, 22 constitute a simple detent structure which holds the cassette 8 against unintentional separation from the housing 1.

The tongues 21, 22 form integral parts of a plate-like carrier 25 which is separably but rigidly secured to the underside of the handgrip portion 4 by a screw 27 or analogous fastener means. As shown in FIGS. 2 and 3, the plate-like carrier 25 is accommodated in an elongated recess or cutout 26 provided in the underside of the handgrip portion 4. The openings 17, 18 are located at the level of the carrier 25 when the projections 13, 14 extend into the respective sockets 16 and the bottom panel 15 of the casing rests on the exposed surface 7 of the top wall 2. An important advantage of the mounting of the carrier 25 on the handgrip portion 4 is that the stationary coupling portions 21-24 of the coupling means for the casing 9 of the cassette 8 are provided on a part (handle 3) which is a standard component of portable motion picture projectors, i.e., which need not be provided for the express purpose of supporting the stationary portions of the coupling. Also, the dimensions of the housing 1 need not be enlarged for the purpose of accommodating a portion of the casing 9 because the latter can rest on the exposured surface 7 of the top wall 2 adjacent to the handle 3. Thus, the dimensions of the housing 1 must be selected with a view to accommodate only the essential components (such as the optical system and the film transporting parts) which contributes to compactness and hence to the eye-pleasing appearance of the housing.

The carrier 25 in the recess 26 of the handgrip portion 4 is provided with two forwardly extending protuberances or abutments 28, 29 which abut against the outer surface of the rear panel 10 when the cassette 8 is located in the illustrated predetermined position. The panel 10 abuts against the protuberances 28, 29 when the tips of the wedge-like heads 23, 24 engage the inclined retaining surfaces 19, 20. Since the tongues 21, 22 are elastic, their heads 23, 24 can exert a slight pressure against the retaining surfaces 19, 20 to urge the outer side of the rear panel 10 against the protuberances 28, 29.

The manner in which the leader of film in the casing 9 of the properly mounted cassette 8 can be threaded through the projector and attached to the core of the takeup reel (not shown) forms no part of the present invention.

It is clear that the improved projector is susceptible of many modifications. For example, the tongues 21, 22 and/or the protuberances 28, 29 can form integral parts of the handgrip portion 4. Also, the tongues 21, 22 can be provided on the connecting portion 5 and/or 6 of the handle 3. The provision of tongues 21, 22 on the connecting portion 5 and/or 6 is desirable when the openings 17, 18 of the rear panel 10 are located at a relatively short distance from the bottom panel 15. A separate carrier for the stationary coupling portions 21-24 is preferred at this time because the carrier can be readily detached from the handle 3 to be replaced with a new carrier (for example, if one of the elastic tongues 21, 22 is damaged or breaks) and also because such carrier can be attached to the handles of existing projectors.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a cinematographic apparatus, particularly in a motion picture projector, a combination comprising a housing having an exposed surface; a handle provided on said housing and having an operative position in which at least a part thereof extends beyond said exposed surface and is ready to be grasped for convenient transport of said housing; a film-containing cassette including a film-confining casing adjacent to said handle and to said exposed surface of said housing; and coupling means for separably locating said cassette in a predetermined position in which the film contained in said casing can be transported between said cassette and said housing, said coupling means comprising at least one first coupling portion provided on said casing and at least one complementary second coupling portion supported by said part of said handle at a point remote from said exposed surface and separably engaging said first coupling portion, said part of said handle having at least one surface which abuts against said casing while said casing is adjacent to said exposed surface of said housing and while said second coupling portion engages said first coupling portion.

2. A combination as defined in claim 1, wherein said casing comprises a bottom panel and a second panel extending upwardly from said bottom panel, said first coupling portion being provided on said second panel at a predetermined distance from said bottom panel and said exposed surface abutting against said bottom panel in said predetermined position of said cassette.

3. A combination as defined in claim 2, wherein said housing comprises a top wall and said exposed surface is provided on said top wall.

4. A combination as defined in claim 1, wherein said part of said handle comprises a handgrip portion and at least one connecting portion securing said handgrip portion to said housing, said second coupling portion of said coupling means being supported by said handgrip portion.

5. A combination as defined in claim 1, wherein said casing has a substantially vertical panel which is provided with said first coupling portion.

6. A combination as defined in claim 1, wherein one of said coupling portions is elastic.

7. In a cinematographic apparatus, particularly in a motion picture projector, a combination comprising a housing; a handle provided on said housing and comprising a handgrip portion and at least one connecting portion securing said handgrip portion to said housing; carrier means secured to said handgrip portion; a film-containing cassette including a film-confining casing adjacent to said handle; and coupling means for separably locating said cassette in a predetermined position in which at least a substantial portion of said cassette extends outwardly beyond said housing and a portion of said cassette extends outwardly beyond said handle, said coupling means comprising at least one first coupling portion provided on said casing and at least one complementary second coupling portion provided on said carrier means and separably engaging said first coupling portion.

8. A combination as defined in claim 1, wherein said carrier means comprises a plate and said housing comprises a top wall which is substantially parallel to said plate, said casing having a bottom panel which abuts against said top wall when the cassette assumes said predetermined position.

9. A combination as defined in claim 7, wherein said second coupling portion is integral with said carrier means.

10. In a cinematographic apparatus, particularly in a motion picture projector, a combination comprising a housing having a wall including at least one projection; a handle provided on said housing; a film-containing cassette including a film-confining casing adjacent to said handle, said casing having a bottom panel provided with at least one recess and a second panel extending upwardly from said bottom panel; and coupling means for separably locating said cassette in a predetermined position in which said bottom panel is adjacent to said wall, in which said projection extends into said recess, in which at least a substantial portion of said cassette extends outwardly beyond said housing and in which a portion of said cassette extends outwardly beyond said handle, said coupling means comprising at least one first coupling portion provided on said second panel of said casing and at least one complementary second coupling portion supported by said handle and separably engaging said first coupling portion.

* * * * *